United States Patent
Dougill et al.

(10) Patent No.: US 6,893,323 B2
(45) Date of Patent: May 17, 2005

(54) METHOD OF AND APPARATUS FOR REMOVING MATERIAL

(75) Inventors: Nicolas John Dougill, Coventry (GB); David John Cartwright, Coventry (GB); Laurence Alfred Bell, Warwickshire (GB)

(73) Assignee: Emerson Electric UK Limited, London (GB)

( * ) Notice: Subject to any disclaimer, the term of this patent is extended or adjusted under 35 U.S.C. 154(b) by 0 days.

(21) Appl. No.: 10/037,981

(22) Filed: Nov. 9, 2001

(65) Prior Publication Data

US 2002/0173224 A1 Nov. 21, 2002

Related U.S. Application Data (63) Continuation of application No. PCT/GB00/01925, filed on May 19, 2000.

(30) Foreign Application Priority Data

May 21, 1999 (GB) .............................................. 9911962

(51) Int. Cl.[7] .............................................. B24B 49/16
(52) U.S. Cl. ........................... 451/11; 451/121; 451/14
(58) Field of Search .............................. 451/11, 10, 24, 451/121, 14, 541

(56) References Cited

U.S. PATENT DOCUMENTS

| | | | |
|---|---|---|---|
| 1,687,965 A | * | 10/1928 | Ainley .................... 125/13.01 |
| 2,685,154 A | * | 8/1954 | Ballinger .................... 451/211 |
| 3,667,165 A | | 6/1972 | McDowell et al. |
| 3,789,379 A | | 1/1974 | Dempsey et al. |
| 3,987,670 A | | 10/1976 | Tuzzeo et al. |
| 4,007,411 A | | 2/1977 | Saito |
| 4,075,792 A | | 2/1978 | Schreiber |
| 4,091,698 A | | 5/1978 | Obear et al. |
| 4,386,305 A | | 5/1983 | Kohzai et al. |
| 4,428,162 A | | 1/1984 | Feldt et al. |
| 4,478,009 A | * | 10/1984 | Rukavina et al. ............. 451/14 |
| 4,589,230 A | | 5/1986 | Yonemura et al. |
| 5,103,705 A | * | 4/1992 | Bechem ....................... 83/491 |
| 5,718,615 A | | 2/1998 | Boucher et al. |
| 5,827,112 A | | 10/1998 | Ball |

FOREIGN PATENT DOCUMENTS

| | | |
|---|---|---|
| DE | 1652145 | 4/1970 |
| DE | 225089 | 7/1984 |
| GB | 374918 | 6/1932 |
| GB | 1383986 | 2/1975 |
| GB | 2305142 | 6/1995 |
| JP | 57083359 | 5/1982 |
| WO | 9812019 | 3/1998 |

* cited by examiner

*Primary Examiner*—Robert A. Rose
(74) *Attorney, Agent, or Firm*—Hodgson Russ LLP (57) ABSTRACT

Apparatus for removing material from a workpiece is described, in which the apparatus comprises means for advancing an abrasive tool towards the workpiece to bring an abrasive surface of the tool into contact with the surface of the workpiece, means for moving the abrasive surface relative to the workpiece to remove material from the workpiece, means for detecting a load applied to the tool by the workpiece, and means for controlling the rate of advancement of the abrasive tool towards the workpiece depending on the magnitude of the detected load.

18 Claims, 5 Drawing Sheets

METHOD OF AND APPARATUS FOR REMOVING MATERIAL

This application is a Con of PCT/GB00/01925 May 19, 2000.

The present invention relates to a method of and apparatus for removing material from, for example, a workpiece. In one embodiment, the present invention relates to a method and apparatus for sectioning a workpiece in which a rotating abrasive wheel sections the workpiece by making a cut of progressively increasing depth in the workpiece. The present invention also relates to apparatus for, and a method of, positioning a tool in preparation for the removal of material from a workpiece.

The term "wheel" as used herein is to be construed broadly to include any body of rotation. Thus, the term ranges from a thin abrasive cutting or sectioning saw to a tool of significant axial length which may have a profiled periphery.

Abrasive cutting wheels are generally formed from sharp abrasive particles held in a resin. As the cutting edge of a fresh wheel is abraded, the resin is worn away to expose the sharp edges of the abrasive particles at the cutting edge. These sharp edges in time become blunted. However, with a sufficient shear force per unit area applied thereto by the workpiece during sectioning, the blunted abrasive particles will eventually be forced out from their positions in the wheel to allow the diameter of the wheel to be reduced so that further sharp abrasive particles are exposed at the cutting edge.

Figure 1:
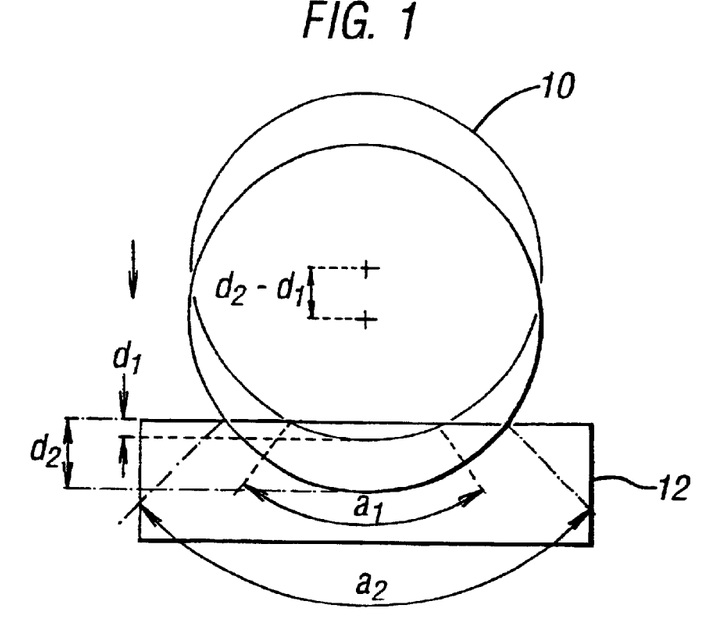
FIG. 1 illustrates cutting of a workpiece with a single feed of a cutting wheel.

FIG. 1 illustrates a typical cutting action, in which a rotating abrasive wheel sections a workpiece in a single "feed", or motion of the axis of the wheel towards the workpiece. During cutting, heat is generated, which propagates into the workpiece.

The amount of heat which propagates into the workpiece is dependent, inter alia, on the ability of the blade to remove cutting material, or "dross", from the workpiece.

As the wheel 10 is advanced into the workpiece 12 at a constant feed rate, the shear force F1 per unit area of wheel in contact with the workpiece decreases as the contact arc a of the wheel 10 increases; as the depth of the cut increases from $d_1$ to $d_2$, the contact arc increases from $a_1$ to $a_2$. This decrease in the shear force F1 can give rise to a situation where the shear force F2 per unit area of wheel 10 required to remove blunt abrasive particles from the cutting edge (in order to expose fresh abrasive particles at the cutting edge) is not reached. This has the effect of blunting the wheel.

One problem associated with blunting of the wheel is that the blunt abrasive particles may rub and burnish the workpiece rather than cutting it. This reduces the ability of the blade to remove material from the workpiece, which can cause excessive heat to be generated in the workpiece, resulting in overheating, or "burning", of the workpiece. This can lead to problems when the cutting is performed to section a part from a workpiece (for example, a gear tooth from a gear wheel) for microstructural analysis, as excessive heat generating during sectioning can "heat treat" the workpiece, with the result that the microstructure of the sectioned part of the workpiece may be altered during sectioning.

This problem may be ameliorated to some extent by using a pulse action where the feed is interrupted whist the wheel is in contact with the workpiece and then fully reinstated. Such a pulsing action is intended to produce a momentarily high shear force F1, thereby replacing any blunted abrasive particles at the cutting edge with fresh abrasive particles. However, if wheel life is not to be sacrificed, it is essential that F2 is not greatly exceeded; it has been found that such pulse action sectioning can reduce wheel life by as much as one half.

Figure 2:
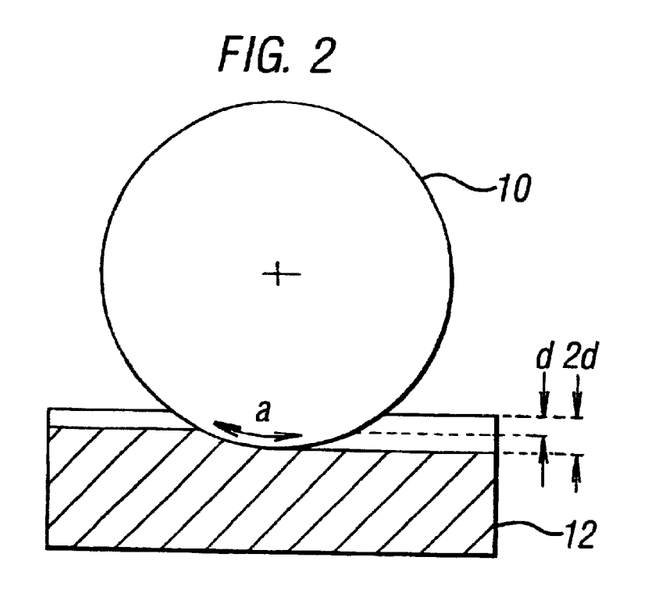
FIG. 2 illustrates cutting of the workpiece with incremental feed of the cutting wheel.

As an alternative to using a pulse action, sectioning may be performed by malting a series of cuts of progressively increasing depth in the workpiece. Such a sectioning action is illustrated in FIG. 2. The sectioning action has two sequentially repeated actions, (i) an incremental feed of depth d of the wheel 10, and (ii) a traverse of the workpiece 12 to produce the cut. However, with this sectioning action cutting is suspended whilst the incremental feed takes place, resulting in increased sectioning time. If constant feed is introduced, a uniform contact arc a cannot be maintained, which may result in blunting of the wheel.

Figure 3A:
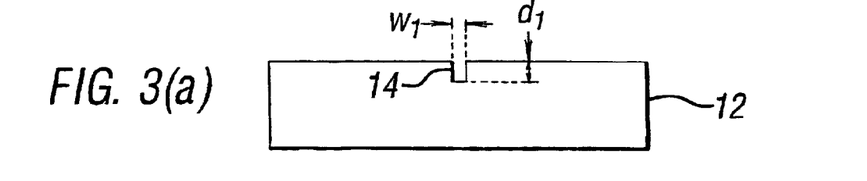
FIG. 3 illustrates deformation of the workpiece as the depth of the cut increases from $d_1$ shown in FIG. 3(a) to $d_2$ shown in FIG. 3(b)
Figure 3B:
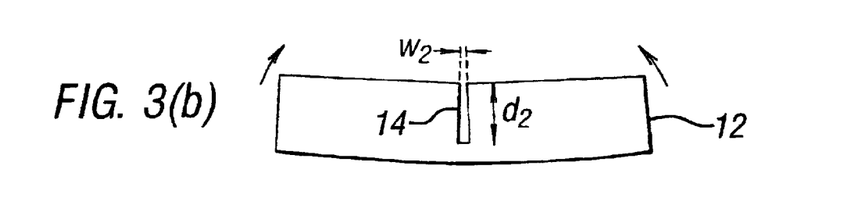

Another problem associated with the sectioning action described with reference to FIG. 2 is illustrated in FIG. 3. As the depth of the cut 14 increases from a depth $d_1$ as shown in FIG. 3($a$) to a depth $d_2$ as shown in FIG. 3($b$), internal stresses within the workpiece can cause the workpiece to bend or otherwise deform. This has the effect of narrowing the width w of the cut at the top of the workpiece from $w_1$ to $w_2$. Such a reduction in the width w of the cut can cause the cut faces of the workpiece to grip the wheel as the cut progresses, exerting a pressure on the cutting motor and potentially stalling or breaking the cutting wheel.

The cutting apparatus is typically programmable in order to enable an operator to programme the apparatus to make a sequence of spaced cuts in the workpiece. For example, the workpiece may be clamped by a clamping mechanism which is traversable relative to the cutting wheel, for example, perpendicular to the cutting edge of the wheel, in order to alter the cutting position of the wheel on the workpiece. The operator can programme a sequence of (i) cutting of the workpiece by the wheel, followed by (ii) movement of the clamping mechanism relative to the wheel, in order, for example, to produce slices of equal thickness for the preparation of test specimens.

Figure 4A:
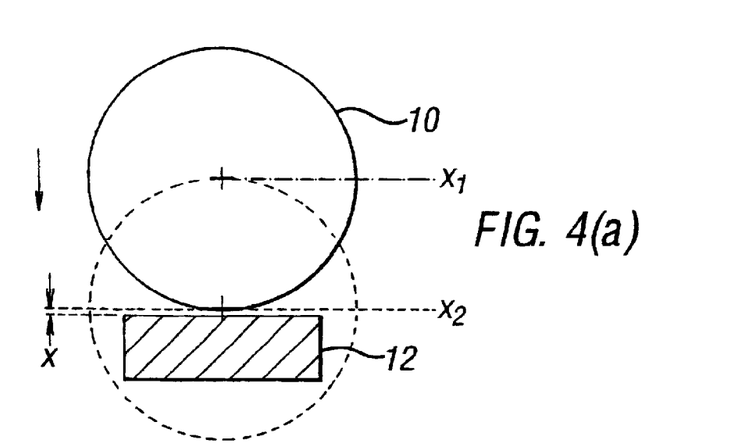
FIG. 4(a) illustrates positions of the cutting wheel during the first of a sequence of spaced cuts in a workpiece.

With reference to FIG. 4($a$), during programming of the sequence of cuts, the operator typically inputs a start position X1 for the centre of the cutting wheel 10, a finish position X2 for the centre of the cutting wheel 10 and a feed rate. These positions are chosen so that the cutting edge of the wheel does not touch the workpiece 12 with the wheel centre at position X1, but with the distance x between the cutting edge of the wheel and the workpiece as small as possible in order to reduce cutting time, and so that the sectioning will have been completed with the wheel centre at position X2.

Figure 4B:
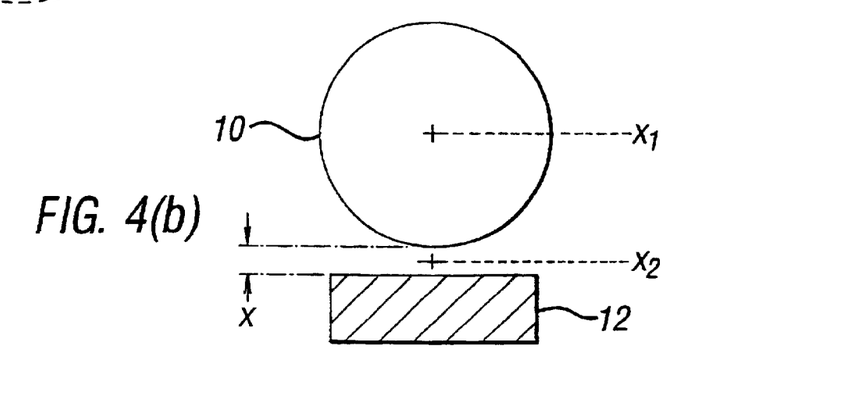
FIG. 4(b) illustrates the position of the cutting wheel at the start of the last of the sequence of spaced cuts in the workpiece.

As discussed above, it is desirable that blunted abrasive particles are forced out from their positions at the cutting edge of the wheel so that further sharp abrasive particles are exposed at the cutting edge. The removal of blunt abrasive particles from the cutting edge of the wheel causes the diameter of the wheel to decrease. Thus, the sequence of cuts will be performed with a wheel of progressively decreasing diameter. As illustrated in FIG. 4($b$), as the diameter of the cutting wheel 10 decreases the distance x between the cutting edge of the wheel 10 and the workpiece increases. Therefore, a significant proportion of the feed of the cutting wheel 10 may be taken up by the movement of the cutting wheel 10 towards the workpiece 12 before any cutting occurs, thereby increasing the cutting time.

In addition, depending on the hardness and dimensions of the workpiece the reduction in the diameter of the wheel may become so severe that towards the end of the cutting sequence sectioning of the workpiece may not have been completed by the time the time finish position X2 has been reached.

In the described embodiments the present invention seeks to solve these and other problems.

In a first aspect, the present invention provides apparatus for removing material from a workpiece, said apparatus comprising:
an abrasive wheel having an abrasive circumferential surface and rotatable about a first axis passing through a centre thereof, and mounted to orbit about a second axis spaced from the first axis;
means for effecting relative advancing movement between the second axis and the workpiece to remove material from the workpiece;
means for detecting a load applied to said wheel by said workpiece; and
means for controlling the rate of the advancing movement depending on the magnitude of the detected load.

In a preferred embodiment of the present invention, an abrasive surface of the wheel is moved with a rotational action to remove material from the workpiece. The energy required to maintain a constant rotational action is dependent upon a number of variables, including the speed of the action, the rate of advancement of the wheel towards the workpiece and the hardness and shape of the workpiece.

As the abrasive surface moves against the workpiece, a load is applied to the wheel by the workpiece. As this load increases, the energy required to maintain the action of the abrasive surface against the workpiece also increases. Above a certain load level, the means for moving the abrasive surface with this action may not be able to maintain the speed of the action, resulting in a reduction of the speed of the action and potential blunting of the wheel, which can lead to burning of the workpiece.

The present invention can avoid such burning of the workpiece by detecting the magnitude of the load applied to the wheel and, if the load rises above a predetermined level, adjusting the rate of the advancing movement between the wheel and the workpiece. By decreasing, for example, the rate of advancement of the wheel towards the workpiece, the speed of the rotational action of the abrasive surface can be maintained at a high enough level to avoid blunting of the abrasive surface, thereby avoiding burning of the workpiece.

Preferably, the detecting means comprises means for monitoring a current drawn to move an abrasive surface of the wheel relative to the workpiece. In a preferred embodiment, the rotational action of the abrasive surface is driven by a motor, for example, a three phase motor drawing current directly from the mains power supply, which draws current sufficient to maintain a constant action of the abrasive surface. If a load is applied to the abrasive surface by the workpiece, the motor must draw more current in order to maintain the constant action of the abrasive surface. Thus, monitoring of the current drawn by the motor provides a convenient technique for monitoring the load on the abrasive surface.

In accordance with this embodiment of the present invention, the control means may be arranged to reduce the rate of the advancing movement when the current is greater than a predetermined value.

Additionally, or alternatively, the control means may be arranged to reverse the advancing movement when the current drawn by the moving means is greater than a predetermined value for a predetermined period of time. This can enable grabbing of the wheel by the workpiece to be easily detected when the wheel is repeatedly (i) fed towards the workpiece and (ii) moved across the workpiece to produce a cut of sequentially increasing depth, as grabbing of the wheel by the workpiece can cause a load to be applied to the wheel even when the abrasive surface is not in contact with the workpiece.

Thus, in a second aspect the present invention provides apparatus for removing material from a workpiece, said apparatus comprising:
an abrasive wheel having an abrasive circumferential surface and rotatable about a first axis passing through a centre thereof, and mounted to orbit about a second axis spaced from the first axis;
means for effecting relative advancing movement between the wheel and the workpiece to remove material from the workpiece;
means for detecting a load applied to the wheel by the workpiece; and
means for controlling said moving means to reverse the advancing movement when the detected load is greater than a predetermined value for a predetermined period of time.

Grabbing of the wheel may be associated with a substantially constant load being applied to the wheel for a period of time. Thus, the control means may be arranged to reverse the advancing movement when the detected load is substantially constant for a predetermined period of time.

The control means may be arranged to subsequently re-effect the advancing movement when the detected load falls below a predetermined value. This can enable the wheel to remove further material from the surfaces of the workpiece previously grabbing the wheel, thus relieving the load applied to the wheel during cutting.

The control means may comprise means for monitoring the magnitude of the detected load during the removal of material at each of a plurality of spaced positions along the workpiece. The monitoring means may also be arranged to monitor the position of the wheel. This can provide accurate monitoring of the condition of the wheel during, for example, pre-programmed cutting of a series of sections from the workpiece.

Preferably, the control means is arranged to control the positioning of the wheel in preparation for the removal of material from one of said spaced positions in response to wear of the wheel during the previous removal of material from at least two of said spaced positions.

In one embodiment, the monitoring means is arranged to detect the extent of the wear of the wheel from the relative positions of the wheel when contact is first made with the workpiece during said previous removal of material from at least two of said spaced positions. In another embodiment, the monitoring means is arranged to detect the extent of the wear of the wheel from the relative positions of the wheel when load applied to the wheel is first detected during said previous removal of material.

From the difference between the positions of the wheel when the magnitude of the detected load reaches the predetermined magnitude, the monitoring means can determine the wear of the wheel whilst removing material at, for example, the first of the spaced positions. The control means can then determine the approximate wear of the wheel whilst removing material at the second of the spaced positions. The control means can then calculate a position at which the wheel will begin to remove material at a third of the spaced positions. After the removal of material at the second of the spaced positions, the wheel can be rapidly moved to a position just before this calculated position.

This process of using data gathered during two previous cuts, for example, can be repeated until all of the pre-programmed cuts have been made in the workpiece. This can provide for a significant decrease in the time taken to perform the series of cuts.

Thus, in a third aspect the present invention provides apparatus for positioning a tool in preparation for the removal of material from a workpiece, said apparatus comprising means for controlling the position of the tool in preparation for the removal of material from one of a plurality of spaced positions along the workpiece in response to wear of the tool as determined during the previous removal of material from at least two spaced positions along the workpiece.

Preferably, the apparatus comprises means for detecting the load on the tool during the removal of material from said spaced positions along the workpiece, said control means being arranged to control the position of the tool in preparation for the removal of material from one of said spaced positions in response to wear of the tool as determined from the relative positions of the tool when load applied to the tool is first detected during said previous removal of material.

In a preferred embodiment, the apparatus comprises means for rotating the tool about an axis. In this case, the tool may comprise an abrasive wheel. There may also be provided means for orbiting the wheel about a second axis spaced from said first-mentioned axis, and means for moving said second axis relative to the workpiece to bring a circumferential edge of the wheel into contact with the workpiece.

Thus, the apparatus may comprise an abrasive wheel having an abrasive circumferential surface and rotatable about a first axis passing through the centre thereof, and mounted to orbit about a second axis spaced from the first axis. Such apparatus is described in International patent application no. WO98/12019, the subject matter of which is incorporated herein by reference. An advantage of this apparatus is that the contact arc a of the wheel is dependent on the rate of feeding the wheel towards the workpiece. Thus, by decreasing the feed rate of the wheel, the contact arc a decreases, thereby increasing the shear force F1 per unit area of wheel in contact with the workpiece and reducing further the likelihood of blunting of the abrasive surface of the wheel.

To avoid problems associated with grabbing of the wheel of such apparatus, the advancing movement may be reversed if the current drawn by the moving means is greater than a predetermined value for at least one third of the time taken for the wheel to perform a full orbit of the second axis.

In a fourth aspect, the present invention provides apparatus for abrasively removing material from a workpiece, said apparatus comprising:

an abrasive wheel having an abrasive circumferential surface and rotatable about a first axis passing through a centre thereof, and mounted to orbit about a second axis spaced from the first axis;

means for effecting relative advancing movement between the wheel and said workpiece to bring the abrasive surface of the wheel into contact with the surface of the workpiece;

means for moving said abrasive surface relative to the workpiece to remove material from the workpiece;

means for detecting a load applied to said wheel by said workpiece; and means for controlling the rate of the advancing movement depending on the magnitude of the detected load.

The present invention extends to a method of removing material from a workpiece, said method comprising the steps of:

rotating an abrasive wheel having an abrasive circumferential surface about a first axis passing through a centre thereof;

orbiting the wheel about a second axis spaced from the first axis;

effecting relative advancing movement between the wheel and the workpiece to remove material from the workpiece;

detecting a load applied to the wheel by the workpiece; and reversing the advancing movement when the detected load is greater than a predetermined value for a predetermined period of time.

The present invention also extends to a method of positioning a tool in preparation for the removal of material from a workpiece, said method comprising the step of controlling the position of the tool in preparation for the removal of material from one of a plurality of spaced positions along the workpiece in response to wear of the tool as determined during the previous removal of material from at least two spaced positions along the workpiece.

Features described above relating to apparatus aspects of the present invention can also be applied to method aspects, and vice versa.

Preferred features of the present invention will now be described, by way of example only, with reference to the accompanying drawings, in which.

Figure 5:
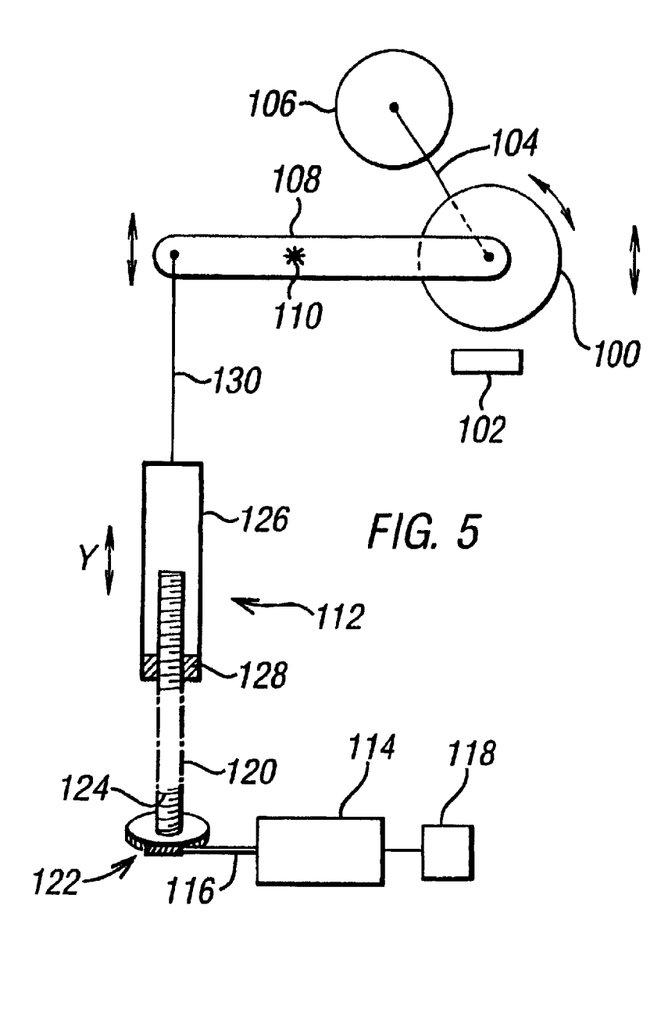
FIG. 5 illustrates an embodiment of apparatus for abrasively removing material from a workpiece.

An embodiment of apparatus for removing material from a workpiece is illustrated in FIG. 5. In this embodiment, the apparatus comprises an abrasive tool in the form of rotatable abrasive wheel 100 having an abrasive circumferential edge for removing material from the workpiece 102. However, the present invention is not limited to such an abrasive tool. For example, the tool may comprise a rotatable wheel having an abrasive face, or a reciprocating saw having a cutting edge.

The workpiece 102 is gripped by a vice (not shown). In order to enable a series of spaced cuts to be made along the workpiece 102, the vice is movable relative to the cutting wheel. Movement of the vice relative to the workpiece may be effected by any suitable mechanism, and may be either manual or automatically controlled by control apparatus in response to commands input from the operator.

Returning to FIG. 5, the wheel 100 is connected to a drive shaft 104 which is rotated by means of a cutting motor 106. The cutting motor 106 is preferably a three phase motor which draws current directly from the mains supply to rotate the drive shaft 104 at a constant rotational speed, although any other suitable motor may be used.

The drive shaft 104 is rotatably mounted at one end of arm 108. The arm 108 is pivoted at 110. An actuator 112 for advancing the wheel 100 towards the workpiece 102 is connected to the other end of the arm 108.

The actuator 112 can take any suitable form. In the embodiment shown in FIG. 5, the actuator 112 comprises an actuator motor 114 which rotates a first actuator drive shaft 116. An encoder 118 is coupled to the actuator motor 114 for rotation by the actuator motor 114 at the same rotational speed and direction as the first actuator drive shaft 116.

The first actuator draft shaft 116 is coupled to a second actuator drive shaft 120 via gearing arrangement 122 for rotation about an axis substantially perpendicular to the rotational axis of the first actuator drive shaft. As shown in FIG. 5, the second actuator drive shaft 120 is in the form of a lead screw 124.

A nut 128 is mounted on the lead screw 124. The nut 128 has an internally threaded bore which engages the external thread of the lead screw 124. The nut 128 is attached to a tube 126 which is in turn connected to the other end of the arm 108 by linkage 130 which prevents the piston from rotating. Thus, the nut 128 can be moved axially relative to the lead screw 124 by rotation of the first actuator drive shaft 116 by the actuator motor 114.

In use, the wheel 100 is rotated by the cutting motor 106 at a constant rotational speed and the first actuator drive shaft 116 is rotated by the actuator motor 114 to move the piston in the direction Y as shown in FIG. 5. This causes the arm to pivot about pivot 110 to move the wheel 100 towards the workpiece 102 in order to abrasively remove material from the workpiece. Once the removal of material has been completed, the rotation of the first actuator drive shaft 116 is reversed by the actuator motor 114, thus reversing the direction of motion of the pivot to move the wheel 100 away from the workpiece.

Figure 6:
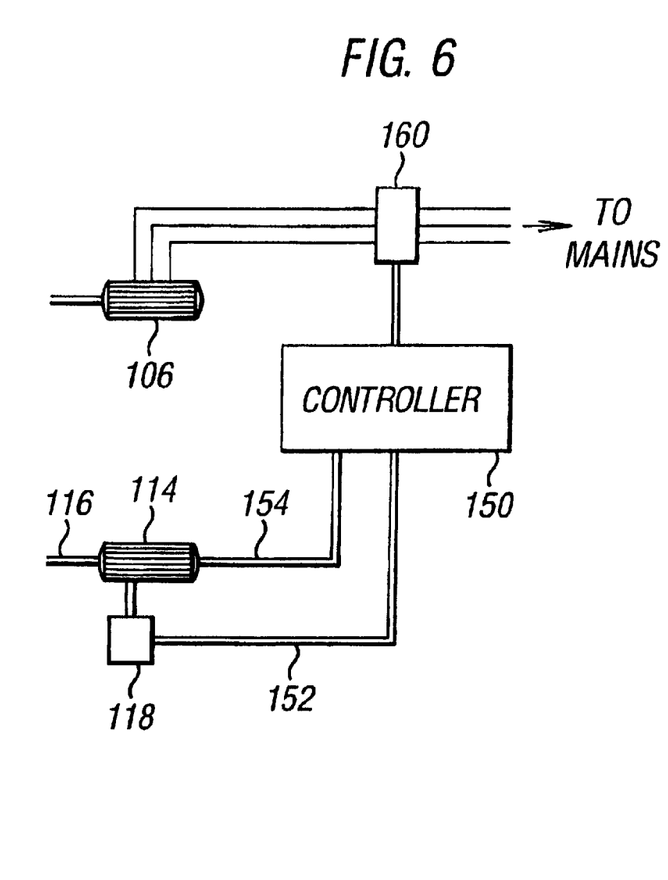
FIG. 6 illustrates an arrangement of the control circuitry in the apparatus described with reference to FIG. 5.

FIG. 6 illustrates the arrangement of the control circuit for the cutting apparatus. The control circuit includes a controller 150, which in this preferred embodiment is provided by a programmable computer into which the operator inputs, inter alia:

the initial rate of feed $v_1$ of the wheel 100 towards the workpiece 102 during cutting of the workpiece;

the start position X1 of feed of the wheel towards the workpiece; and the end position X2 of feed of the wheel towards the workpiece (for sectioning of the workpiece, X2 may be a default value).

The operator selects these parameters depending on the hardness of the workpiece and the cross-sectional area and dimensions of the workpiece.

The controller 150 is connected to the encoder 118 via electrical linkage 152. The controller monitors the speed and direction of the encoder 118 in order to obtain information concerning the rotational speed and direction of the first actuator drive shaft 116. This enables the controller 150 to monitor the position of the wheel 100, and speed and direction of movement of the wheel 100 towards the workpiece 102. In order to control position of the wheel and the speed and direction of movement of the wheel 100 towards the workpiece 102 in response to the information received from the encoder 118, the controller 150 is connected to the actuator motor 114 via electrical linkage 154.

In addition to monitoring and controlling the position and movement of the wheel 100 relative to the workpiece 102, the controller also monitors the magnitude of the load applied to the wheel by the workpiece by monitoring the size of the current drawn by the cutting motor 106 from the mains power supply. As illustrated in FIG. 6, the controller 150 is connected to a transformer 160 which outputs to the controller 150 a signal of magnitude dependent on the size of the current drawn by the cutting motor 106 from the mains power supply.

Figure 7:
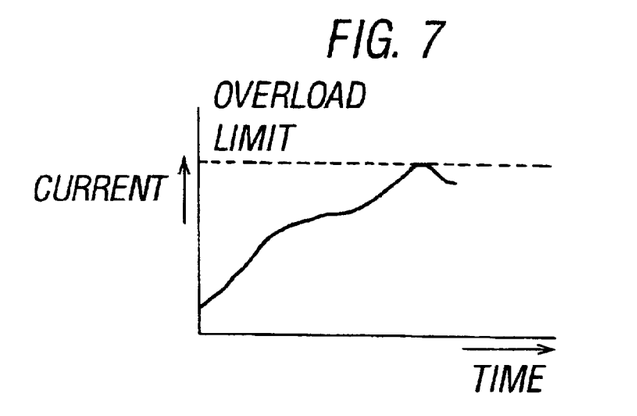
FIG. 7 illustrates a typical increase in the current drawn by the motor for rotating the wheel during cutting.

As the wheel 100 is fed from start position X1 towards the workpiece 102 at feed rate $v_1$, a load is applied on the wheel 100 by the workpiece 102 when the wheel contacts the workpiece. This will tend to have a retarding effect on the rotation of the blade. In order to overcome this load applied on the blade and maintain a constant rotational speed of the wheel, the cutting motor 106 draws an increased amount of current from the mains power supply. As the depth of the cut increases, the contact arc a of the wheel typically increases, increasing the load applied to the wheel by the workpiece. Thus, in order to maintain the constant rotational speed of the wheel, as the cutting progresses the cutting motor typically draws an increasing amount of current from the mains power supply. This is illustrated in FIG. 7.

Above a certain load level the cutting motor may become "overloaded", that is, the motor may not be able to overcome the retarding effect of the applied load by drawing further current from the mains supply. Thus, the cutting motor 106 will not be able to maintain the constant rotational speed of the wheel, resulting in a reduction in the rate of the rotation of the wheel (or even stalling of the blade). This reduction in the rate of rotation of the wheel reduces the shear force applied to the wheel by the workpiece, which can lead to non-removal of blunt abrasive particles at the cutting edge of the wheel.

As discussed previously, during cutting heat is generated which propagates into the workpiece. The amount of heat generated is dependent, inter alia, on the ability of the blade to remove the waste cutting material, or "dross", from the workpiece. One problem associated with blunting of the wheel is that the blunt abrasive particles may rub and burnish the workpiece rather than cutting it. This reduces the ability of the blade to remove material from the workpiece, which can cause burning of the workpiece.

In order to avoid overloading of the wheel, and thus any problems associated with burning of the workpiece, a limit of the amount of current to be drawn by the cutting motor, referred to as an "overload limit", is set by the operator of the apparatus. The overload limit is typically set according to the size of the cutting motor and the properties (size, composition, hardness, etc.) of the workpiece 102.

When the overload limit is reached, as determined by the magnitude of the signal received from the transformer 160, the controller 150 controls the actuator motor 114 of the actuator 112 to reduce the rate of rotation of the first actuator shaft 116, and thus the rate of feed $v_1$ of the wheel 100 towards the workpiece 102. This has the effect of reducing the load applied to the wheel 100 by the workpiece 102 and thus, as illustrated in FIG. 7, the amount of current required to be drawn by the cutting motor 106 from the mains power supply in order to maintain the constant rotational speed of the wheel. If following the decrease in the feed rate $v_1$ of the wheel the overload limit is reached again, the feed rate $v_1$ is decreased further. Thus, burning of the workpiece by the wheel can be substantially prevented.

Cutting continues in this manner until the end position X2 of the wheel is reached, at which point the controller 150 controls the actuator motor 114 to withdraw the wheel from the workpiece, typically at a fixed speed $v_2$ greater than $v_1$, to start position X1. The vice can then be moved in order to re-position the workpiece 102 to enable a second cut to be made in the workpiece.

As discussed earlier, when a series of spaced cuts are to be made in the workpiece, the reduction in the diameter of the cutting wheel can lead to an effective increase in the cutting time. This is because the distance x between the edge of the cutting wheel 100 and the workpiece 102 when the wheel is at start position X1 increases as the series of cuts progresses. Thus, the wheel is moved an increasing distance at the relatively slow feed rate $v_1$ before contacting the workpiece 102.

In order to overcome this problem, the controller 150 modifies the rate of advancement of the wheel towards the workpiece in response to wear of the wheel in order to reduce, for a number of the series of cuts, the time taken for the wheel to move the distance x. This is described in more detail below in an example in which four spaced cuts are made in a workpiece 102.

Cut 1

The rotating wheel is first advanced by the actuator 112 at feed rate $v_2$ to start position X1. From start position X1, the rotating wheel is advanced towards the workpiece 102 at feed rate $v_1$ to cut the workpiece. The controller 150 monitors the current drawn by the cutting motor 106 and stores the position of the wheel, as determined from the information received from the encoder 118, at which the current drawn by the cutting motor first increases. Thus, the position X3 at which the wheel first contacts the workpiece 102 during the first cut is stored by the controller 150. Cutting continues as described above until end position X2 is reached by the wheel.

Cut 2

From the end position X2, the wheel is withdrawn from the workpiece at rate $v_2$ to start position X1 and the vice moved to position the workpiece for the second cut. The second cut proceeds in a similar manner to the first cut. From start position X1, the rotating wheel is advanced towards the workpiece 102 at feed rate $v_1$ to cut the workpiece. The controller 150 monitors the current drawn by the cutting motor 106 and stores the position of the wheel, as determined from the information received from the encoder 118, at which the current drawn by the cutting motor first increases. Thus, the position X3' at which the wheel first contacts the workpiece 102 during the second cut is stored by the controller 150. Cutting continues as described above until end position X2 is reached by the wheel.

Cut 3

Prior to withdrawal of the wheel from the workpiece, the controller compares positions X3 and X3'. For a workpiece of known profile, any difference between these two positions will be due to wear of the cutting wheel during the first cut, resulting in a reduction of the diameter of the wheel. From the difference between X3 and X3', the controller determines the amount of wear of the wheel during the first cut. Assuming that the wear of the wheel during the second cut will be approximately the same as the amount of the wear of the wheel during the first cut, the controller determines a position $X3''_{art}$ at which the wheel will first contact the workpiece during the third cut. The wheel is then withdrawn from the workpiece at rate $v_2$ to a position X1' just before $X3''_{art}$ (so that there is no contact between the wheel and the workpiece whilst the workpiece is moved to the third cutting position) and the vice moved to position the workpiece for the third cut. Alternatively, the wheel may be moved directly to position $X3''_{art}$.

From this start position, the rotating wheel is advanced towards the workpiece 102 at feed rate $v_1$ to cut the workpiece. The controller 150 again monitors the current drawn by the cutting motor 106 and stores the position of the wheel, as determined from the information received from the encoder 118, at which the current drawn by the cutting motor first increases. Thus, the actual position X3" at which the wheel first contacts the workpiece 102 during the third cut is stored by the controller 150. Cutting continues as described above until end position X2 is reached by the wheel.

Cut 4

Prior to withdrawal of the wheel from the workpiece, the controller compares positions X3' and X3". From the difference between X3' and X3", the controller determines the amount of wear of the wheel during the second cut and thus a position $X3'''_{art}$ at which the wheel will first contact the workpiece during the fourth cut. The wheel is then withdrawn from the workpiece at rate $v_2$ to a position X1" just before $X3'''_{art}$ (so that there is no contact between the wheel and the workpiece whilst the workpiece is moved to the third cutting position) and the vice moved to position the workpiece for the third cut. Again, alternatively, the wheel may be moved directly to position $X3'''_{art}$.

From this start position, the rotating wheel is advanced towards the workpiece 102 at feed rate $v_1$ to cut the workpiece. With this being the last of the series of cuts, there is no need for the controller to store the position at which cutting commences. Cutting continues as described above until end position X2 is reached by the wheel, at which point the wheel is fully withdrawn from the workpiece.

The above process of making a sequence of cuts has the effect of reducing distance x for cuts conducted after the first and second cuts. This in turn has the effect of effectively increasing the rate of advancement of the wheel towards the workpiece before the wheel makes contact with the workpiece, thus decreasing cutting time.

It will be apparent from the above that, as well as adjusting the start position X1, the controller can also alter the end position X2 in a similar manner to compensate for the wear of the blade.

The cutting apparatus described with reference to FIG. 5 performs cutting by making a single feed or advancement of the wheel towards the workpiece. However, the above described techniques for improving the cutting action of the wheel are also applicable to apparatus in which the cutting is performed using two sequentially repeated actions, (i) an incremental feed of the wheel 10, and (ii) a traverse of the workpiece 12 to produce the cut.

Figure 8:
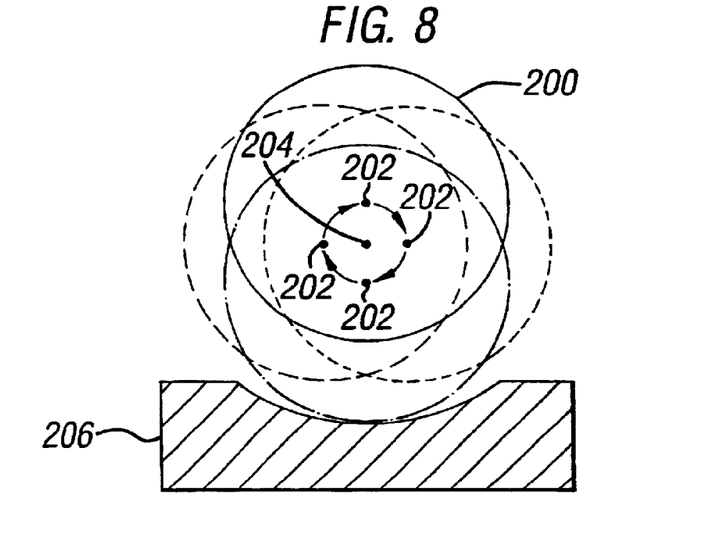
FIG. 8 illustrates the action of an alternative embodiment of apparatus for abrasively removing material from a workpiece.

An example of such an apparatus is described in International patent application no. WO98/12019, the subject matter of which is incorporated herein by reference. With reference to FIG. 8, this document describes cutting apparatus in which the cutting wheel 200 rotates about a first axis 202 and orbits about a second axis 204 spaced from the first axis 202.

Figure 9:
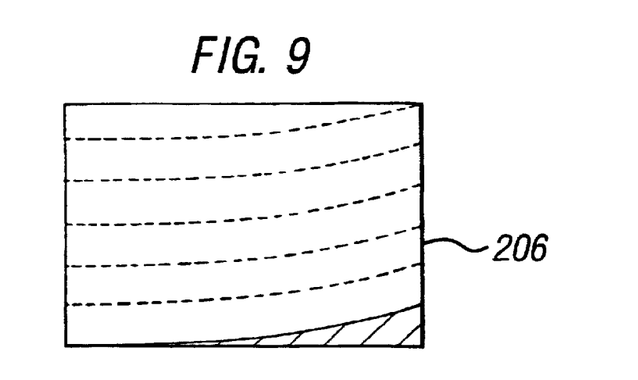
FIG. 9 illustrates the profile of a sequence of cuts made in a workpiece using the apparatus described with reference to FIG. 8.

The second axis 204 is constantly advanced towards the workpiece 206. With reference to FIG. 9, sectioning of the workpiece 206 is carried out by making a plurality of cuts in the workpiece, each cut being performed during a respective orbit of the second axis about the first axis.

This apparatus has the advantage of maintaining a low contact arc a during cutting. The contact arc a of the wheel is dependent on the feed rate of the wheel towards the workpiece. Thus, if the feed rate of the wheel is reduced when the overload limit is reached, the contact arc a decreases, thereby increasing the shear force F1 per unit area of wheel in contact with the workpiece and reducing further the likelihood of blunting of the abrasive surface of the wheel.

As discussed previously, a problem encountered with such cutting apparatus which performs cutting in a number of "passes" of the workpiece by the wheel is grabbing of the wheel by the workpiece during cutting. This grabbing of the workpiece can cause additional loads to be applied to the wheel during cutting and which may result in stalling or breaking of the cutting wheel.

In order to avoid such problems with grabbing, the controller 150 monitors the current drawn by the cutting motor 106 during cutting in order to detect signs of grabbing.

As will be appreciated, in conditions of no grabbing of the blade, increased current should be drawn by the cutting motor only when the wheel is cutting the workpiece. With this orbital cutting apparatus, cutting will take place during a fraction of one orbit of the second axis, for example, up to one third of the orbit. Grabbing will result in load being applied to the workpiece even when the wheel is not cutting the workpiece, that is, as the wheel enters the slot being cut in the workpiece prior to cutting and as the wheel leaves the slot after cutting.

Figure 10A:
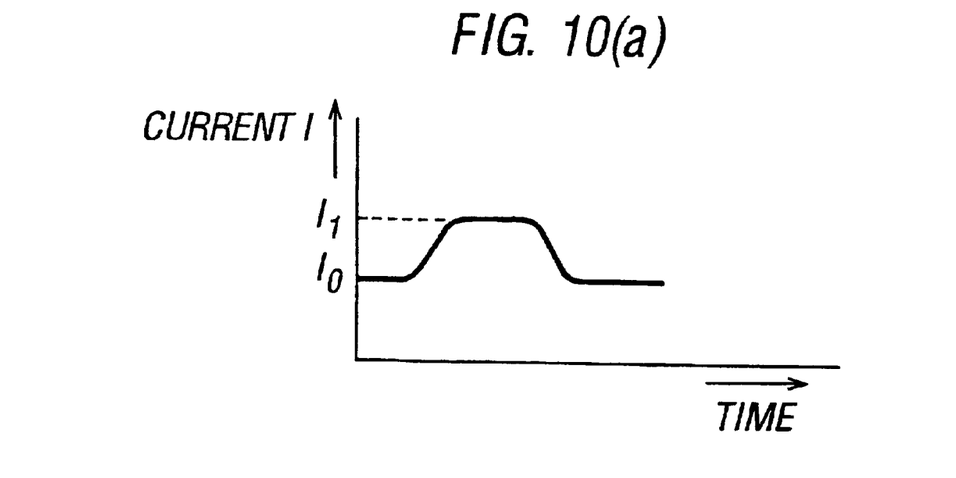
FIGS. 10(a) and (b) illustrate typical variations in the current drawn by the motor for rotating the wheel during orbital cutting.
Figure 10B:
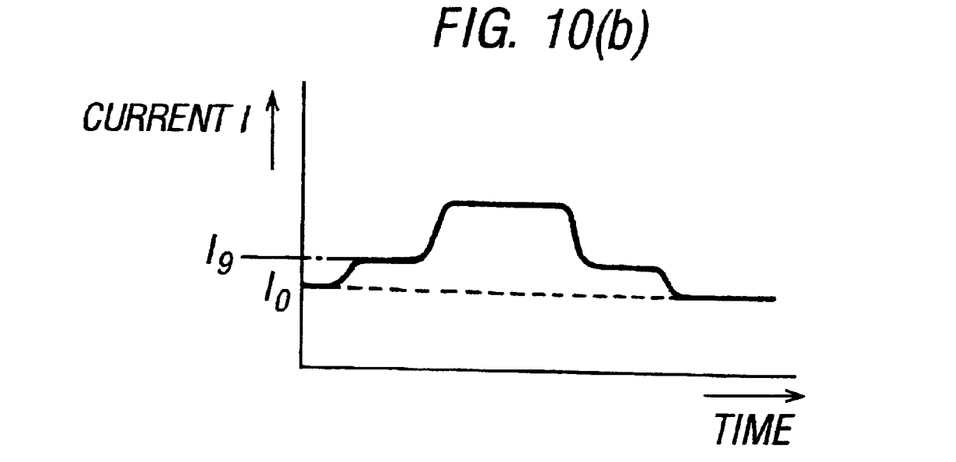

FIG. 10 illustrates the change in the current I drawn by the cutting motor during orbital cutting. In FIG. 10(a), when there is no grabbing of the wheel by the workpiece the current first rises from a current $I_0$ required to rotate the blade with no applied load to a constant value $I_1$ when the blade is cutting with a substantially constant cutting arc a. As the wheel leaves the workpiece, the current I decreases from $I_1$ to $I_0$. When there is grabbing of the wheel, as illustrated in FIG. 10(b) the current rises first to a current $I_g$ to overcome the grabbing of the blade before increasing again during cutting of the workpiece. As the depth of the cut increases, so the extent of grabbing, and therefore the size of current $I_g$ required to overcome the grabbing, increases.

In order to prevent wheel or workpiece damage due to grabbing, the controller controls the actuator motor to reverse the advancement of the blade towards the workpiece when the magnitude of the current drawn by the cutting motor 106 is above a predetermined value, or "anti-grab" value, for a predetermined period of time. For this orbital cutting action, this predetermined period of time may be greater than one third of the time taken for the wheel to perform a single orbit about the second axis. The anti-grab value may be set by the operator depending on the size of the cutting motor and the characteristics (strength, composition, cross-section, etc.) of the workpiece.

In order to re-commence cutting after the wheel has been withdrawn from the workpiece, the controller may re-advance the tool towards the workpiece when the current drawn by the cutting motor falls below another predetermined value, which may be equal to $I_0$ or otherwise set by the operator of the apparatus. This can enable the wheel to remove further material from the surfaces of the workpiece which are grabbing the wheel, thus relieving the grabbing of the wheel by the workpiece.

Although grabbing has been described above with reference to orbital cutting apparatus, the principle of withdrawing the wheel when the current drawn by the cutting motor is greater than the "anti-grab" value for a predetermined period of time is also applicable to cutting via a single feed of the wheel towards the workpiece.

Each feature disclosed in this specification (which term includes the claims) and/or shown in the drawings may be incorporated in the invention independently of other disclosed and/or illustrated features.

What is claimed is:

1. Apparatus for removing material from a workpiece, said apparatus comprising:
   an abrasive wheel having an abrasive circumferential surface and rotatable about a first axis passing through a centre thereof, and mounted to orbit about a second axis spaced from the first axis;
   means for effecting relative advancing movement between the second axis and the workpiece to remove material from the workpiece;
   means for detecting a load applied to said wheel by said workpiece; and
   means for controlling the rate of the advancing movement depending on the magnitude of the detected load, said control means comprising means for monitoring the magnitude of the detected load during the removal of material at each of a plurality of spaced locations along the workpiece.

2. Apparatus according to claim 1, wherein the detecting means comprises means for monitoring a current drawn to move the abrasive surface of the wheel relative to the workpiece.

3. Apparatus according to claim 1, wherein the detecting means comprises means for monitoring a current drawn to rotate the wheel.

4. Apparatus according to claim 2 or 3, wherein the control means is arranged to reduce the rate of the advancing movement when said current is greater than a predetermined value.

5. Apparatus according to claim 1, wherein the control means is arranged to reverse said advancing movement when said detected load is greater than a predetermined value for a predetermined period of time.

6. Apparatus according to claim 5, wherein the control means is arranged to subsequently re-effect the relative advancing movement between the second axis and the workpiece when said detected load falls below a predetermined value.

7. Apparatus according to claim 1, wherein the control means is arranged to control the positioning of the wheel in preparation for the removal of material from one of said spaced positions in response to wear of the wheel during the previous removal of material from at least two of said spaced positions.

8. Apparatus according to claim 7, wherein the monitoring means is arranged to detect the extent of the wear of the wheel from the relative positions of the wheel when contact is first made with the workpiece during said previous removal of material.

9. Apparatus according to claim 7, wherein the monitoring means is arranged to detect the extent of the wear of the wheel from the relative positions of the wheel when load applied to the wheel is first detected during said previous removal of material.

10. A method of removing material from a workpiece, said method comprising the steps of:
    rotating an abrasive wheel having an abrasive circumferential surface about a first axis passing through a centre thereof;
    orbiting the wheel about a second axis spaced from the first axis;

effecting relative advancing movement between the second axis and the workpiece to remove material from the workpiece;

detecting a load applied to said wheel by said workpiece;

controlling the rate of the advancing movement depending on the magnitude of the detected load; and monitoring the magnitude of the detected load during the removal of material at each of a plurality of spaced positions along the workpiece.

11. A method according to claim 10, wherein the load applied to the wheel by the workpiece is detected by monitoring a current drawn to move the abrasive surface of the wheel relative to the workpiece.

12. A method according to claim 10, wherein the load applied to the wheel by the workpiece is detected by monitoring a current drawn to rotate the wheel.

13. A method according to claim 11 or 12, wherein said rate of advancing movement is reduced when said current is greater than a predetermined value.

14. A method according to claim 10, wherein the advancing movement is reversed when the detected load is greater than a predetermined value for a predetermined period of time.

15. A method according to claim 14, wherein the advancing movement is subsequently re-effected towards the workpiece when the detected load falls below a predetermined value.

16. A method according to claim 10, wherein the positioning of the wheel in preparation for the removal of material from one of said spaced positions is controlled in response to wear of the wheel during the previous removal of material from at least two of said spaced positions.

17. A method according to claim 16, wherein the extent of the wear of the wheel is detected from the relative positions of the wheel when the magnitude of the detected load reaches a predetermined value during said previous removal of material.

18. A method according to claim 16, wherein the extent of the wear of the wheel is detected from the relative positions of the wheel when load applied to the wheel is first detected during said previous removal of material.

* * * * *